(12) United States Patent
Stoy

(10) Patent No.: US 6,232,406 B1
(45) Date of Patent: May 15, 2001

(54) HYDROGEL AND METHOD OF MAKING

(75) Inventor: Vladimir A. Stoy, Princeton Township, NJ (US)

(73) Assignee: Replication Medical Inc., W. Conshohocken, PA (US)

(*) Notice: Subject to any disclaimer, the term of this patent is extended or adjusted under 35 U.S.C. 154(b) by 0 days.

(21) Appl. No.: 09/409,995

(22) Filed: Sep. 30, 1999

(51) Int. Cl.[7] ....................................... C08F 8/12
(52) U.S. Cl. .................. 525/329.1; 524/827; 524/829; 524/830; 524/831; 525/329.2; 525/354
(58) Field of Search ................... 524/827, 829, 524/830, 831; 525/329.1, 329.2, 354

(56) References Cited

U.S. PATENT DOCUMENTS

| | | | |
|---|---|---|---|
| 2,812,317 | 11/1957 | Barrett | 260/88.7 |
| 2,837,492 | 6/1958 | Stanton et al. | 260/29.6 |
| 2,861,059 | 11/1958 | Mowry et al. | 260/85.5 |
| 3,709,842 | 1/1973 | Stoy | 260/2.5 |
| 3,812,071 | 5/1974 | Stoy | 260/29.6 |
| 3,873,508 * | 3/1975 | Turner | 524/566 |
| 3,897,382 | 7/1975 | Stoy et al. | 260/29.6 |
| 3,926,930 | 12/1975 | Ohfuka et al. | 260/85.5 |
| 3,948,870 | 4/1976 | Stoy et al. | 260/85.5 |
| 3,987,497 | 10/1976 | Stoy et al. | 3/1 |
| 4,026,296 | 5/1977 | Stoy et al. | 128/349 |
| 4,053,442 | 10/1977 | Jungr et al. | 260/29.6 |
| 4,107,121 | 8/1978 | Stoy | 260/29.6 |
| 4,123,406 | 10/1978 | Stoy et al. | 260/29.6 |
| 4,172,823 | 10/1979 | Stoy et al. | 260/29.6 |
| 4,173,606 | 11/1979 | Stoy et al. | 264/1 |
| 4,183,884 | 1/1980 | Wichterle et al. | 264/41 |
| 4,228,056 | 10/1980 | Stoy | 260/29.6 |
| 4,272,422 | 6/1981 | Tanaka | 260/29.6 |
| 4,366,206 | 12/1982 | Tanaka | 428/373 |
| 4,374,175 | 2/1983 | Tanaka | 428/369 |
| 4,379,874 | 4/1983 | Stoy | 524/27 |
| 4,420,589 | 12/1983 | Stoy | 525/93 |
| 4,943,618 | 7/1990 | Stoy et al. | 525/340 |
| 5,218,039 * | 6/1993 | Stoy et al. | 524/566 |
| 5,252,692 | 10/1993 | Lovy et al. | 526/342 |
| 5,496,890 | 3/1996 | Sackmann et al. | 525/329.1 |

OTHER PUBLICATIONS

N. Plate et al., Effect of Neighboring Groups In Macromolecular Reactions: Distribution Of Units, Journal Of Polymer Science, vol. 12, 2165–2185, 1974.

V. Stoy, Determination Of The Elementary Rate Constants Of Autoacceleration Reactions On Polymers, Journal Of Polymer Science, vol. 13, 1175–1182, 1975.

V. Stoy, Calculation Of The Elementary Rate Constants Of Polymer–Analogous Reactions And Sequence Analysis Of Products, Journal of Polymer Science, vol. 15, 1029–1033, 1977.

* cited by examiner

Primary Examiner—Bernard Lipman
(74) Attorney, Agent, or Firm—Kenneth P. Glynn

(57) ABSTRACT

The present invention is a method of making acrylonitrile copolymers having multi block structure comprising acrylic acid, acryl amids and acrylamidine hydrophilic groups in hydrophilic blocks and residual nitrile groups in hydrophobic blocks, by partial hydrolysis of polyacrylonitrile to a predetermined hydrolysis conversion at which the hydrolysis is self terminating by a process that improves quality and reduces product heterogeneity. It includes forming a first reaction mixture which includes polyacrylonitrile dissolved in an aqueous reactive solvent containing sodium thiocyanate; forming a second reaction mixture comprising a reaction catalyst of the general formula MY dissolved in an aqueous reactive solvent containing sodium thiocyanate; mixing the reaction mixtures of steps (a) and (b) above to form a master reaction mix; dividing the reaction mix into a plurality of physical reaction compartments so as to increase outer surface area relative to volume as compared to outer surface area of a single reaction compartment to enhance cooling efficiency and to reduce undesirable center core thermal effects; and, heating the divided master reaction mix to a predetermined reaction temperature range and maintaining the temperature range for a predetermined time sufficient for completion of a predetermined level of hydrolysis at which the resulting copolymer solution is substantially stable at ambient temperature. The invention also includes hydrogel products resulting from the method.

25 Claims, No Drawings

HYDROGEL AND METHOD OF MAKING

BACKGROUND OF THE INVENTION

1. Field of the Invention

The present invention relates to hydrogels and, more particularly, to methods of making hydrogels utilizing controlled hydrolysis by self-termination.

2. Information Disclosure Statement

Polyacrylonitrile (PAN) polymers are frequently used for fabrication of membranes, for manufacture of textile fibers, for production of carbon fibers and hydrogels, or as engineering plastics. Their composition vary widely from pure PAN homopolymer to copolymers of acrylonitrile (AN) with to about 20% molar of various comonomers. AN is typically combined either with hydrophilic co-monomers (such as acrylamide, vinyl pyrrolidone, styrene sulfonic acid, vinylsulfonic acid etc.) or with hydrophobic comonomers (such as alkyl acrylates or methacrylates, styrene, vinylchloride, methylstyrene, vinylpyrridine etc.). Such copolymers are usually considered to be PAN as long as they still retain the main characteristics of PAN, namely, high crystallinity and high melting point in absence of PAN solvents. PAN is practically unmeltable because its melting temperature (theoretically over 320° C.) is higher than its decomposition temperature (PAN becomes discolored at temperatures above about 150° C. and above about 200° C. it turns into insoluble, non-meltable precursors of graphite).

PAN has a unique crystalline structure with main X-ray diffraction periodicity of about 5.2 Angstroms, insensitivity to stereo-regularity of the polymer and lateral organization of crystallites in oriented states. Other typical properties of PAN are excellent environmental stability and high tensile strength, particularly in oriented state.

As other non-meltable polymers (e.g., aramides), PAN have to be processed from solutions in suitable solvents (such as DMSO, DMF, concentrated solutions of $ZnCl_2$ and some other) using a suitable "wet" method (for instance, by coagulation, dry spinning etc.)

Some of the AN copolymers are rendered meltable by introduction of suitable comonomers. Such copolymers are processable by usual plastic-processing methods such as extrusion or injection molding. However, this cannot be achieved without a substantial destruction of crystalline structure and loss of certain valuable properties, such as high thermal stability. There is a substantial structural difference between meltable "modacrylic" copolymers and non-meltable PAN.

AN is sometimes combined with highly polar comonomers to increase its hydrophilicity and improve certain desirable properties such as dyeability of textile fibers, wettability of separation membranes, and the like. PAN copolymers with hydrophilic comonomers are sometimes used to form hydrogels, i.e. water-insoluble elastomers containing large amount of water. Hydrogels are particularly useful for biomedical products such as implants, wound dressings, contact lenses, bioseparation membranes and lubricious coatings.

Hydrogels can be either of a conventional "thermoset" type with a covalent network, or "thermoplastic" hydrogels with physical network formed by interactions between hydrophobic groups. Covalently crosslinked PAN-based hydrogels are sometimes synthesized by a combination of polymerization of AN monomer in aqueous solvents, such as concentrated solutions of ZnCl2 or HNO3. Hydrophilic comonomers are often derivatives of acrylic acid, such as salts, esters, amides, amidines, hydrazidines and the like. If such comonomers are copolymerized with AN, they are randomly distributed in the PAN chain. Copolymerization of AN with hydrophilic comonomers in concentrated zinc chloride solutions to form crosslinked hydrogels is described in U.S. Pat. No. 3,812,071 (A. Stoy). Modification of PAN properties by copolymerization with carboxylated co-monomers and subsequent treatment with alkalies is described in U.S. Pat. No. 4,272,422 (Tanaka). A relatively low concentration of randomly distributed hydrophilic monomers is needed to achieve solubility in water or very high swelling. This is because the crystallization capability requires a certain minimum length of the sequence of nitrile groups in 1,3 positions. As the length of continuous sequences of AN units (ie., the sequence of AN units between two non-AN units) decreases with increasing content of randomly distributed non-AN comonomers, so decrease crystallinity, thermal stability and other useful properties of PAN polymers. It was observed that properties of such hydrogels can be improved if polymerization or copolymerization of AN and aqueous inorganic solvents is followed by acid-catalyzed hydrolysis, as it is described in U.S. Pat. No. 4,123,406 (A. Stoy et al.), U.S. Pat. No. 4,172,823 (A. Stoy et al.) and U.S. Pat. No. 4,228,056 (A. Stoy).

It was postulated that improved properties in hydrolyzed PAN is due to a complementary physical network. In many cases, the physical network formed by a controlled partial hydrolysis of PAN is stable enough and additional covalent network is unnecessary.

Such a hydrolysis is typically carried out by using acid catalysis leading to formation of multi-block copolymers (MBC) with alternating sequences of acrylonitrile and acrylamide units. PAN solvents useful for acid hydrolysis are typically concentrated aqueous $ZnCl_2$ solutions, as described in U.S. Pat. No. 2,837,492 (Stanton et al.) and U.S. Pat. No. 3,987,497 (A. Stoy et al) or in concentrated inorganic acids, such as sulfuric acid, nitric acid, phosphoric acid and mixtures thereof. Such process is described, for example, in the U.S. Pat. No. 3,926,930 (Ohfuka et al.), U.S. Pat. No. 3,709,842 (A. Stoy), U.S. Pat. No. 4,026,296 (A. Stoy et al.), U.S. Pat. No. 4,173,606 (V. Stoy et al.) and U.S. Pat. No. 4,183,884 (Wichterle et al.).

The physical network in PAN-based hydrogels can be formed by clusters of polyacrylonitrile sequences. Physically crosslinked PAN hydrogels have their nitrile groups (AN units) and hydrophilic groups organized in alternating sequences, forming so-called "Multi-Block Copolymers" (MBC). If AN sequences (also called "Hard blocks") are sufficiently long, they separate in presence of water from sequences of hydrophilic units (also called "Soft Blocks") to form the network-forming crystalline clusters. A certain minimum length of the Hard block is necessary for the phase separation. Moreover, certain length of Hard Block is required to build a stable crystalline cluster. Actual minimum lengths of Hard Blocks are not known. According to some estimates, only hard blocks with 5 or more nitrile units are effective in building the network-forming clusters.

One can appreciate that the phase separation in the MBC is not clean or perfect. Each crystalline cluster will contain some hydrophilic groups that are disturbing its organization. Crystalline clusters will have also a broad distribution of sizes. Consequently, crystalline clusters will have a broad distribution of melting points and resistance of the cluster to the local stress. Such hydrogels typically show limited thermal stability and distinct creep behavior under stress. The longer the hard blocks and more uniform their length in a MBC, the better thermal and mechanical stability in the resulting hydrogel.

AN-containing MBCs are produced by suitable reactions of PAN (typically hydrolysis or aminolysis) converting pendant nitrile groups into hydrophilic derivatives of acrylic acid. The reactions leading to MBC are so called "Zipper reactions" in which nitrile groups adjacent to already reacted group (i.e., an acrylic acid derivative other than nitrile) are more reactive than nitrile groups adjacent to other nitriles (which is the basic arrangement in the original PAN homopolymer). Hydrophilic "Soft Blocks" are initiated by a relatively slow reaction of a nitrile flanked by other nitriles on both sides. Once a new pendant group is introduced, the "Soft Blocks" can grow by a faster propagation reaction. The propagation of the Soft Block continues until reaction consumes all available nitrile groups in the given polymer chain, unless the reaction is terminated before the nitrile consumption is completed. If all nitriles are consumed, the product is a water-soluble acrylic polymer (useful, for instance, as an additive to drilling mud in oil production).

To form a MBC, more than one "Soft Block" has initiated in each chain. Formation of MBC requires specific relations between molecular weight and rates of initiation, propagation and termination rates of the Zipper reaction. If these conditions are not met, the reaction yields a random copolymer, an alternating copolymer, blend of homopolymers or other intermediate unsuitable for hydrogel fabrication. Even if MBC is formed, its average length of blocks and lengths of block distribution may vary in a broad range depending on the reaction kinetics. General analysis of zipper reaction products is provided, for instance, by N. Plate et al., in Journal of Polymer Science: Polymer Chemistry Edition, Vol. 12, 2165–2185 (1974). In practical terms, the sequential analysis requires knowledge of rate constants of elementary reactions. Such methods are described, e.g., by V. Stoy in Journal of Polymer Science: Polymer Chemistry Edition, Vol. 13, 1175–1182 (1975) and Journal of Polymer Science: Polymer Chemistry Edition, Vol. 15, 1029–1033 (1977).

From the aforementioned follows that controllable and reproducible fabrication of stable thermoplastic hydrogels requires unusual level of control over the reaction kinetics (reaction rates of most reactions typically effects only the process economy. In the case of MBCs reaction kinetics also directly affects the product quality.) The reaction control is required on several levels:

To synthesize a useful MBC, the zipper reaction has to be stopped at a preset partial conversion. This is a rather unusual requirement for a chemical reaction where a maximum conversion is usually desirable. The reaction conversion can be, in principle, limited by availability of one of the co-reagent. Such reaction would be "self-terminating" at the conversion when one of the reacting components is depleted. Because we require a specific but limited conversion of nitrile groups, its coreagent has to be present in a lesser molar concentration than nitrile groups. This is particularly difficult in case of hydrolysis because water is present in a large molar excess as part of the reaction.

The self-termination is sometimes possible in the case of heterogeneous, alkali-catalyzed hydrolysis of PAN (a.k.a. saponification) at elevated temperatures that is used to produce water-soluble or super-absorbent acrylic polymers. U.S. Pat. No. 2,812,317 (Barret et al.) describes a direct multi-step saponification of aqueous PAN emulsions by alkali metal hydroxides at an elevated temperature. According to Barret, saponification under these conditions is a stochiometric reaction of nitrile with hydroxide yielding carboxylate. Therefore, one molecule of hydroxyde is consumed for each reacted nitrile group and the alkali metal hydroxide can be added in each step in a limited amount to be consumed by the saponification process.

Similar process used to produce water-soluble polymers of acrylic acid by saponification of PAN slurries is described in U.S. Pat. No. 2,861,059 (Mowry et al.). The saponification is carried out in presence of water-miscible liquids that are poor solvents for both PAN and saponification products. Because the goal is a substantially complete saponification, the amount of hydroxide is not critical as long as the final product is water-soluble.

Partial saponification of acrylic fibers in presence of a high concentration of alkali metal hydroxide is described in the U.S. Pat. No. 4,366,206 (Tanaka). High concentration of the hydroxyde or other electrolytes causes a change of mechanism so that the product of saponification is a crosslinked hydrogel rather than water-soluble acrylate polymer. Composition of the reagent liquid can be changed by addition of various organic or inorganic substances as long as it does not dissolve PAN fibers. The described saponification process is carried out in the molar excess of hydroxide. Therefore, reaction conversion (i.e., the thickness of the outer hydrogel jacket) has to be controlled by the reaction time.

Improvement of the above process is described in U.S. Pat. No. 4,374,175 (Tanaka). The improvement consists in contacting PAN fibers with only a limited amount of the reagent so that the reaction can proceed only to a certain depth, leaving the fiber core intact. The process has to be run at a high temperature to achieve a high reaction rate and to allow the control of the thickness of the hydrogel layer. U.S. Pat. No. 5,496,890 (Sackmann et al.) describes superabsorbent polymers prepared by direct partial saponification of PAN dispersions. The product contains 30 to 60 mol. % of carboxylate groups, 20 to 60% of carbonamide groups, 10 to 20% of residual nitrile groups and its swelling capacity is up to 1000 grams of water on 1 gram of polymer. The process uses contacting a dispersed PAN particles with aqueous solution of an alkali metal hydroxide, in amount corresponding to more than one mol of hydroxide per one mol of converted nitrile. Reaction conversion is monitored by amount of released ammonia and terminated by neutralization of excess of hydroxide reagent by addition of an acid, e.g. a hydrochloric acid.

The last five references show that saponification of solid PAN has different mechanism than solution reactions of PAN and yield products of different compositions that are not MBCs. Solution reactions of PAN are typically carried out with a large excess of the co-reagent. For that reason, it was not possible to use self-termination control in any of the hitherto known processes for MBC production. In all cases described so far, PAN hydrolysis is terminated by coagulation of the intermediate MBC and/or extraction or neutralization of the reaction components such as solvents and catalysts, at some time when the desired conversion was presumably achieved. Control of the end-point by time is very difficult because it requires a precise control of the reaction rate which is sensitive to variation in temperature, concentrations and other variables. Moreover, it is difficult to terminate the reaction at the same time for all polymer chains, particularly if the reaction is carried out on an industrial scale. This contributes to heterogeneity of the product, since not all polymer chains have the same composition. (i.e., conversion distribution).

As indicated in the above description, there are numerous technical problems with PAN hydrolysis processes that use the same compound as a solvent and a catalyst. These problems lead to heterogeneity and poor crystallinity of these products, as manifested by their meltability in presence swelling agents that are not solvents of PAN, such as water and glycerol. This is an advantage for processing these hydrogels from simple melts, as described in the U.S. Pat. No. 4,053,442 (Jungr et al.) Several patents proposed control of heterogeneity and sequential composition of products by various means (U.S. Pat. No. 3,897,382 (V. Stoy et al.) and U.S. Pat. No. 3,948,870 (V. Stoy et al.), but could not solve the fundamental problem of the reaction endpoint.

The previously described solution hydrolysis of PAN uses an acid catalysts. Base-catalyzed PAN hydrolysis can be also carried out in solutions. In this case, the mechanism is different from acid-catalyzed hydrolysis as well as from the above described base-catalyzed heterogeneous hydrolysis. Not only is the mechanism different, but the reaction product has a different chemical composition and structure. Such a process is described in U.S. Pat. No. 4,107,121 (V. Stoy) involving a homogenous base-catalyzed hydrolysis of PAN dissolved in aqueous rhodanide solution. The described reaction can be catalyzed by various bases, including ammonia, tertiary amines, carbonates and hydroxides of alkali metals. This reaction yields anionic polymers with just a minor concentration of other reaction products, such as acrylamide. The resulting polymers are thermally unstable since can be melted even in dry state. This indicates low, if any, crystallinity of PAN clusters. Once swelled in water, resulting hydrolyzates can be molten at temperatures as low as 75° C., unless they are covalently crosslinked. The hydrolyzates prepared by this method are often spontaneously covalently crosslinked by side reactions of nitrile groups.

The reaction described in U.S. Pat. No. 4,107,121 is not self-terminating since water from the solvent is present in a large molar excess. Besides, the described reaction is catalyzed even by ammonia that is one of the reaction products. The manufacturing method requires reaction termination by removing the catalyst either by neutralization or by washing.

Because of the termination control problems with solution hydrolysis of PAN, hydrolytic and other reactions of PAN are sometimes carried out in so called so called "aquagel state" that combines certain properties of heterogeneous and solution reaction systems. This process is described in the U.S. Pat. No. 4,943,618 (V. Stoy et al.). According to this patent, PAN is first brought into the aquagel state that is permeable for water-miscible reagents. CN groups in aquagel state are reactive similarly as in the solution. Consequently, aquagel can participate in many reactions, including acid or base catalyzed hydrolysis, aminolysis, alcoholysis, hydrazinolysis, Ritter and other reactions. This system allows monitoring of reaction conversion by measuring swelling of the product in the reaction mixture. This simplifies somewhat the end-point detection. Although such described hydrolytic reactions are not self-terminating and have to be quenched by removal of the catalyst, simplified end-point detection allows better control over the final product conversion and thus better reproducibility.

However, heterogeneous reactions are always diffusion-controlled at least to some extent, leading to higher conversion on the solid-liquid interface than in the bulk of the solid particle. This further contributes to the product heterogeneity via a broad distribution of conversion among polymer chains. In many cases, MBC copolymers coexist with still unreacted PAN. This is sometimes deemed an advantage for hydrophilic fibers or sluries such as described in the previously discussed Tanaka's patents, or membranes and low-swelling hydrogels for catheters and other devices, as described in the U.S. Pat. Nos. 4,379,874 and 4,420,589 (both V. Stoy). The last two patents suggest using homopolymer PAN as an additive to stabilize the crystalline clusters in the hydrogel. This is designed to bypass inherent problems with controlling MBC sequential composition via reaction kinetics. However, this measure is more suitable for hydrophilic polymers and hydrogels with low water content than for highly swelling hydrogels. Heterogeneous products are not suitable for medical-grade hydrogels with a high water content and for many applications, such as ophthalmic lenses. In other cases, MBC coexist with fully hydrolyzed, water-soluble polymers that can diffuse uncontrollably from such hydrogels over long time periods. In some case all three types of polymers (i.e., unreacted PAN; MBC; and water-soluble acrylate) can coexist in one product. Such complexity complicates control over the properties and is hardly suitable for biomedical polymers.

From other prior art describing PAN modifications other than hydrolysis, it is worth mentioning U.S. Pat. No. 5,252,692 (Lovy et al.). This patent describes aminolysis of PAN by reaction between nitriles and primary amines, yielding copolymers comprising N-substituted amides and N-substituted amidines as the main reaction product. This reaction can be carried out both as a solution reaction and as a heterogeneous reaction. Although the self-termination is not mentioned specifically, the maximum conversion of aminolysis can be, at least in theory, controlled by molar ration CN/primary amine in the reaction mixture. In practical terms, however, this reaction cannot be considered self-terminating because the competing hydrolytic reaction cannot be controlled in the same way.

From the above description of Prior Art is obvious that hydrolysis of PAN is a very complicated reaction which outcome is very dependent on reaction conditions, including nature of catalyst, temperature, concentrations, presence and type of PAN solvent and other parameters. It is also obvious that hitherto known reaction mixtures yielding acrylic MBCs are inherently unstable so that reaction has to be terminated and product isolated at a precisely defined moment. These factors complicate production and decrease utility of acrylic MBCS.

Notwithstanding the prior art, the present invention is neither taught nor rendered obvious thereby.

SUMMARY OF THE INVENTION

This invention involves a process of self-terminating hydrolysis of PAN that substantially eliminates heterogeneity of resulting MBC and yields a substantially stable solution of MBC that can be converted into shaped hydrogel articles by extrusion, casting, molding, dipping, spinning or similar shaping method combined with coagulation by an aqueous liquid. The conditions for the self-terminating PAN hydrolysis require alkali metal catalyst MY in a certain specific molar ratio to CN groups in 1,3 position and presence of sodium thiocyanate.

Hydrolytic Reaction Comprises Three Essential Steps:
1) Mixing of reaction mixture from at least two components A and B in a predetermined ratio, one component (A) comprising dissolved PAN and one component (B) comprising basic catalyst of the general formula XY, with both components comprising sodium thiocyanate and water.
2) Separation of still liquid homogeneous mixture into multiple compartments or vessels so that it achieves a high specific surface suitable for efficient cooling.
3) Heating the mixture to predetermined reaction temperature and maintaining such temperature for a predetermined time that is sufficient for completion of the reaction to a preselected conversion;

Transferring the resulting MBC solution into a vessel for storage, transport of further processing by coagulation.

Resulting hydrogels have high water content, high thermal stability even in full hydration and excellent mechanical properties.

DETAILED DESCRIPTION OF THE PRESENT INVENTION

The self-termination of hydrolysis of AN in the present invention is achieved by neutralization of the strong base catalyst MY by weakly acidic groups formed by the reaction of those CN groups that are initially in mutual 1,3 positions. CN groups in 1,3 positions hydrolyze by a certain mechanism that is a precondition for our invention. If the starting polymer contains a minor concentration of other CN groups (e.g., isolated CN groups), a proper correction can be established. In the further text, by CN groups are meant pendant CN groups in 1,3 positions.

It was discovered that there is a predictable and reproducible but surprisingly non-stechiometric relation between product composition, molar ratio [MY]/[CN] and maximum reaction conversion for given reaction conditions. This knowledge allows for control of the end-point simply by using a certain predetermined specific value of [MY]/[CN] for each desired conversion. The constant of proportionality A (described below) can be established for given reaction conditions such as temperature and solvent composition. There is no need to terminate the reaction by extraction or neutralization of the solvent and/or catalyst at a certain time because the reaction stops by itself (self-termination) once catalyst is neutralized by the reaction product, based on the foregoing.

This relation between composition of reaction mixture and ultimate conversion can now be determined empirically. For instance, one can vary [MY]/[CN] for certain reaction conditions (temperature, solvent composition, PAN grade, PAN concentration, catalyst composition) and find the resulting reaction conversion after a sufficient reaction time. The desirable ratio can be also estimated in advance by calculation as follows:

Molar Conversion MC (in %) is $$MC=([CN]_0-[CN])/(100 \cdot [CN]_0) \tag{1}$$

Where $[CN]_0$ and $[CN]$ are molar concentrations of nitrile groups in the reaction mixture initially and at the end, respectively.

The base-catalyzed reaction of CN in presence of sodium thiocyanate ultimately yields three main types of groups: Carboxyles (COOH), amides ($CO.NH_2$) and amidines ($CNH.NH_2$). Therefore, the final concentration of CN will be $$[CN]=[CN]_0-([COOH]+[CO.NH_2]+[CNH.NH_2]) \tag{2}$$

It was established that in presence of sodium tiocyanate, COOH is formed at a constant ratio with respect to the other two groups, namely, $$[COOH]=a \cdot ([CO.NH_2]+[CNH.NH_2]) \tag{3}$$

It was also found that amidines and amides are formed at an approximately constant rate for a given reaction conditions, so that $$[CO.NH_2]=b \cdot [CNH.NH_2] \tag{4}$$

where a and b are selectable constant.

By combining (3) and (4), the following is obtained:

$$[CNH.NH_2]=[COOH]/a \cdot (1+b) \tag{5}$$

and by substituting from Equation (1) above, the following is obtained:

$$[COOH]=\{a/(1+a)\} \cdot MC \cdot [CN]_0/100 \tag{6}$$

and $$[CNH.NH_2]=\{1/(1+a)(1+b)\} \cdot MC \cdot [CN]_0/100 \tag{7}$$

The catalyst cation $M^+$ is bound to some, but not all COOH. It is postulated that presence of ionized COOH suppresses ionization of other COOH in its vicinity and thus their effectiveness in neutralization of MY by binding of $M^+$. This binding effectiveness is expressed by the constant c. Furthermore, some COOH can interact with amidines that are strongly cationic groups competing with $M^+$ for binding sites. The relative binding strength of amidine and $M^+$ let be expressed by constant d. The maximum d=1, in which case each amidine groups are in interaction with one COOH.

Therefore, concentration of neutralized MY will be $$[MY]=[COOH]/c-d \cdot [CNH.NH_2] \tag{8}$$

Combining equations (10 to (8) leads to $$[MY]/[CN]_0=A \cdot MC/100 \tag{9}$$

where $$A=\{a(1+b)-c.d.\}/\{c \cdot (1+a) \cdot (1+b)\} \tag{10}$$

It was found that the reaction under the conditions of this invention yields ⅔ of COOH groups and ⅓ of groups of formula—C(=Z)NH2 where Z is either O or NH. The groups where Z=O are neutral amide groups, the groups where Z=NH are cationic amidine groups. It was thus discovered empirically that the molar ratio of amide to amidine groups ranges from about 0.6 to about 2.0 and the average ratio for typical reaction conditions has value 1.4. Furthermore, it was found that on average, both amide and amidine groups are always flanked by carboxyl groups on both sides. These relations depend on reaction conditions and were expressed by selectable constants in Equations (1) to (10). Typical values and ranges of these constants are as follows:

| Value: | Range: |
|---|---|
| a = 2 | 1.95–2.2 |
| b = 1.4 | 0.6–2.0 |
| c = 2 | 1.6–3.2 |
| d = 1 | 0.5–1.1 |

As shown by prior art, solvent can have a major effect on reaction mechanism. Therefore, selection of the reaction solvent is important. It has to be a good solvent for PAN and the final product and has to be compatible with the catalyst. The solvent affects the reaction by affecting ionization of intermediates, carboxylate groups and catalyst. Unsuitably selected solvent may lead to entirely different polymer than a MBC composed of the groups identified above. For purposes of the present invention, the optimum solvent is an aqueous solution comprising sodium thiocyanate in concentration from about 50% to about 60% by weight and preferred from 53% by weight to 57% by weight.

A minor part of the sodium thiocyanate can be replaced by potassium, lithium or calcium thiocyanate without rendering the solvent inoperable for the invention. As a rule, not more than 33% by weight of sodium thiocyanate should be replaced for another thiocyanate. A minor part of water in the Solvent A can be replaced for organic liquids, such as lower aliphatic alcohols C1 to C3, glycerol or ethylene glycol. As a rule, not more that 25% by weight of water should be replaced by such organic liquids. It should be appreciated that even a minor change in the solvent composition can lead to a significant change in values of constant a, b, c b and d.

Catalyst of the reaction is a strong base of general formula $M^+Y^-$ where M stands for Li, K or Na and $Y^-$ stands for an anion derived from a weak acid with pKa higher than about 5. Typical $Y^-$ is $OH^-$, $SiO_2^{2-}$, $CN^-$ or $CO_3^{2-}$. Preferred catalyst is NaOH.

The process comprises the following essential steps:
1) PAN is dissolved in an aqueous inorganic solvent S comprising sodium thiocyanate to form Solution A. The PAN concentration in the Solution A is denoted ($c_{PAN,A}$), in [% by weight];
2) Catalyst MY is dissolved in said solvent S to form Solution B. The MY concentration in the Solution B is denoted ($c_{MY,B}$), in [% by weight];
3) Solutions A and B are mixed in the weight ratio (A/B), at a temperature to [° C.]. The concentration of PAN in the reaction mixture C is ($c_{PAN,C}$) and concentration of the catalyst is ($c_{MY,C}$), both in [% by weight]. The molar ratio is $$[MY/PAN]=(MW_{PAN}/MW_{MY})*(c_{MY,C})/(c_{PAN,C}) \tag{11}$$

where $MW_{PAN}$ and $MW_{MY}$ are molecular weights of average PAN unit (53 Daltons for AN) and for the catalyst (40 for NaOH), respectively. The amounts of the Solutions A and B are selected to achieve a certain predetermined value of [MY]/[PAN];
4) Reaction temperature is increased to temperature $t_r$[° C.] and maintained at that temperature for a reaction time $T_r$ that is sufficient for reaching the desired conversion; and,
5) Temperature is decreased ambient temperature. The resulting casting Solution C is kept in a closed container until processing into a hydrogel For the self-termination, it is imperative to select reaction conditions such that ammonia and bases of equal or lower strength are not effective catalysts of the hydrolytic reaction. Namely, ammonia is being formed as a by-product of the above described hydrolytic reaction. If the newly formed ammonia were able to react with CN groups and/or to catalyze hydrolysis under the selected reaction conditions, then such reaction could not be self-terminating. The catalytic effectiveness of ammonia can be suppressed by carrying the reaction in a solvent with very high ionic strength and relatively low temperature. The solvent requirements are defined above. Reaction temperature should be between 50° C. and 100° C., preferably between 60° and 80° C. Selection of reaction conditions is essential. It is known from the prior art that under different conditions, ammonia and even weaker bases are effective catalysts of PAN hydrolysis. Hydrolysis of CN catalyzed by ammonia would prevent the self-termination of the reaction.

Although the process is simple, the underlying chemical reaction is not. It is postulated that the base-catalyzed hydrolysis of PAN in presence of sodium thiocyanate proceeds in two steps:
1) Base-catalyzed polymerization of nitrite groups to form a "ladder-polymer" section or block on the polymer chain; and,
2) Hydrolysis of the Ladder-Polymer Intermediate (LPI) into the final MBC.

As in most consecutive reactions, concentration of the LPI intermediate starts from zero, goes through a maximum and than decreases back to zero. LPI is poorly soluble in the Solvent S. Therefore, viscosity of the reaction mixture increases with LPI concentration going through a maximum. The viscosity at its maximum may be so high that the reaction mixture becomes rubbery or even solid before it becomes fluid again. The reaction mixture cannot be mixed in this phase, and conditions for heat transfer are very poor. Since the hydrolytic reaction of PAN is exothermic, temperature in the bulk of the reaction mixture increases more than at the reaction vessel wall, resulting in uneven reaction temperature. Temperature can increase above the required limit in some parts of the reaction mixture and were it would loose its self-terminating character. Moreover, the sequential distribution is sensitive to reaction temperature because the initiation, propagation and termination reactions have different activation energies. Consequently, uneven temperature of reaction mixture leads to heterogeneity of the product. If the reaction is carried out in a large container, it can even obtain a character of a run-away reaction yielding an undefined char, or even lead to an explosion. Therefore, it is paramount to control reaction temperature even if reaction mixture cannot be agitated.

For that end should the ratio of thermostatable surface/volume should be kept higher than 20 [$m^{-1}$] and preferably over 50 [$m^{-1}$]. This can be achieved by various methods, such as inserting a tubular heat exchanger into the reaction mixture at the beginning of step 4 and optionally removing it again after the reaction mixture regained its fluidity. The preferred method involves dividing the reaction mixture into multiple portions before the step 4 and rejoin them after step 4 and preferably after step 5. This can be achieved by dispersing the reaction mixture into a non-miscible fluid (e.g., kerosene or silicone oil), or by filling the mixture into multiple small-diameter vessels placed in a thermostated heat-transfer liquid. Once the reaction is completed, the Casting Solution can be collected for storage and/or processing. These measures would be very difficult for processes that are not self-terminating since this would lead to an increased heterogeneity of the product.

The improved process translates not only into less expensive production, but also into MBC product with substantially improved homogeneity and, consequently, improved reproducibility, mechanical strength, stability, clarity and other properties. Product has also improved biocompatibility due to lower content of water-extractable fractions. The process and product properties can be further improved by elimination of oxygen and/or actinic light during the reaction and storage of the casting MBC solution. Presence of oxygen and light cause a certain discoloration of the product, probably by stabilizing certain intermediate chromophoric structures in the polymer. Elimination of these side reactions improves the product quality and further improves predictability of end-point and reproducibility of the process. As mentioned above, the process according yields stable, storable solution of MBC ("Casting solution") that can be processed into shaped hydrogel articles at some future time. This is provides a flexibility to the manufacturing process as well as improved control over the product quality. The raw casting solution contains ammonia as the by-product. Ammonia is malodorous and decreases stability and shelflife of the casting solution. It has been found that ammonia can be neutralized by addition of weak acids including boric acid and organic hydroxy acids, such as citric acid. Stronger acids cannot be used since they decompose thiocyanate present in the solution. Thus stabilized casting solution is clear, substantially colorless and stable for extended time periods at ambient temperature, particularly if stored in dark containers and/or under an inert gas.

The whole manufacturing process is completed by conversion of casting solution into a shaped hydrogel article, such as rod, fiber, tube, foil, etc. Solution is solidified by so called coagulation. Coagulation consists in bringing the solution in certain defined shape (a thin layer, a spherical droplet, and a fiber), in contact with water what diffuses into the solution and decreases the thiocyanate concentration. Decreased thiocyanate concentration initiates phase separation of hydrophobic "hard blocks" and consequential solidification of casting solution. The solvent and other residuals are then extracted by excess of water or an aqueous solution.

The hydrogel produced by our process has the advantage of swelling much more in pure water than in isotonic solution. While this may be essentially true for any hydrogel with high concentration of ionic groups, it can be rarely utilized for hydrogel purification because of the extreme brittleness of most such hydrogels if swelled in pure water. The mechanical properties of the product hydrogels (which are consequence of the structure and its regularity, i.e. due to the process) allow safe extraction even at an extremely high water content where diffusivity is high even for large molecules. This allows extraction from hydrogel of residuals with relatively high molecular weight, such as water-soluble oligomers. Once the hydrogel is brought under isotonic conditions, its swelling decreases dramatically and so does its permeability limit. The residual oligomers, if any, are effectively and permanently entrapped in the gel under the use conditions. This is a substantial advantage for biomedical polymers where oligomers are often very difficult to extract. Hydrogels formed by our process are very stable even at a high temperature. Product from such hydrogels can be sterilized by autoclaving even in highly hydrated state (e.g., at 90% by weight liquid content or even higher).

Still another consequence of structural regularity (i.e., a consequence of our process) is excellent shape memory in a broad range of conditions. This property allows full rehydration of deformed xerogels, plastification in deformed shape, anisotropic swelling and other unique and useful properties.

MBC resulting from our process have both anionic and cationic groups attached directly to the main chain. Moreover, each cationic group is adjacent to two anionic groups, and can form internal salts in a narrow range of pH. This leads to a dramatic decrease in swelling in the range of pH between 3.5 and 4.0. The hydrogel resulting from our process can change equilibrium solid content from in more than order of magnitude change and ration between solid and liquid in even broader range. This property allows construction of anisotropic implants swellable in preferred directions and changing not only their size, but also their geometry upon contact with body fluids.

This invention is further illustrated by the following non-limiting examples:

EXAMPLE 1

155 weight parts of polyacrylonitrile homopolymer having weight average molecular weight of 155,000 Dalton is dispersed in 450 weight parts of water. 605 weight parts of crystalline sodium thiocyanate are gradually added in the course of approximately three hours under stirring at temperature approximately 60° C. PAN is substantially dissolved during this period, forming a viscous Solution A. Solution A is stirred for another six hours at approximately 70° C. to complete the dissolution and then cooled down below 25° C.

Solution B is prepared in another vessel. 15.5 weight parts of NaOH and 250 weight parts of sodium thiocyanate are dissolved in 250 weight parts of deionized water (DIW) at ambient temperature.

Solution A and B are mixed in weight ratio 2.347 in a stirred glass-lined reactor, at 22° C. The resulting master mix has the following composition (all percents are by weight):

| | |
|---|---|
| PAN | 8.08% |
| NaOH | 0.90% |
| Sodium thiocyanate | 49.55% |
| Water | 40.57% |

This composition corresponds to molar ratio [MY/CN]= 0.1325

The mixture is filled into multiple glass containers with plastic enclosures. Each has a volume of approximately 10 liters, height 330 mm and diameter 200 mm. The closed containers are immersed in water bath and kept at temperature 70° C. for 48 hours. Once the temperature is increased, the mix in the containers quickly darkens and increases viscosity. Gradually, it becomes dark brown rubbery solid. As the reaction continues, the color gradually changes from dark brown to reddish brown to dark orange to yellow. At the same time, the composition liquefies to roughly the original viscosity. The resulting solution is a viscous liquid of honey-like appearance and of strong ammonia odor. The polymer composition is measured by NMR directly after the reaction and then again after 30 day storage in a glass bottle at ambient temperature with all concentrations in molar percent. The compositions are identical within the method accuracy. Hydrogels made from the solution immediately after reaction and after 30 day solution storage were also identical, as shown by their water content (in weight percent) and appearance. Data indicating storage stability of the copolymer solution are summarized in the following table:

| | After reaction: | After 30 days: |
|---|---|---|
| Acrylonitrile units: | 54.9% | 55.1% |
| Acrylic acid units: | 10.2% | 30.0% |
| Acrylamide units: | 8.9% | 9.3% |
| Acrylamidine units: | 6.0% | 5.8% |
| Hydrogel water content in DIW | 98.8% by wt. | 98.6% by wt. |
| Hydrogel liquid content in 0.9% by wt. NaCl | 90.6% by wt. | 90.6% by wt. |

The solution is substantially stable for even more prolonged periods of storage time at ambient conditions.

For further processing, containers are opened and discharged into stainless steel vessels. The solution is heated to 55° C. for several hours under alternating applications of vacuum and nitrogen. When the viscous solution is free of bubbles, it is discharged through a nozzle into a water bath to coagulate into the shape of a hydrogel rod. The hydrogel is washed several times in water and then with the aqueous solution of 0.9% by weight NaCl until no sodium thiocyanate residue is detectable in the extract.

The resulting hydrogel contains 90.3% by weight of isotonic saline. Tensile strength at ambient temperature and full hydration by isotonic solution is about 6 kg per square cm, which is at least about two to three times stronger than other hydrolylates of PAN with similar liquid content and polymer composition. We believe that this improvement can be attributed to improved homogeneity of the polymer.

Extruded hydrogel rod can be dried under stress to be used as a component of a tissue expander device. The hydrogel has swelling strongly dependent on swelling medium. If placed in pure water, it swells in volume until it contains more than 98% by weight of liquid. If it is placed into a diluted acid (e.g.phosphoric acid or nitric acid) and then washed in pure water, it shrinks strongly, and becomes opaque stiff rubbery plastic with water content less than 80% by weight. It can regain water content by neutralization with a weak base, such as a sodium hydrocarbonate aqueous solution. This behavior is useful in some applications and it is believed to be caused by the presence of acrylamidine and carboxylate groups in the same polymer chain.

EXAMPLE 2

155 weight parts of polyacrylonitrile copolymer containing 94 molar % of acrylonitrile and 6 molar % of methylacrylate and having weight average molecular weight of 110,000 Dalton is dissolved in a solution of 380 weight parts of water. 50 weight parts of calcium thiocyanate and 450 weight parts of sodium thiocyanate. PAN is gradually added to the agitated solution until it substantially dissolves to a viscous Solution A. Solution A is stirred for another six hours at approximately 60° C. to complete the dissolution and then cooled down to ambient temperature below 22° C.

Solution B is prepared in another vessel. 6.65 weight parts of NaOH is dissolved in a solution containing 110 weight parts of sodium thiocyanate and 110 weight parts of deionized water (DIW) at ambient temperature.

Solution A and B are mixed in weight ratio 4.283 in a stirred glass-lined reactor at 25° C. The resulting master mix has the following composition (all percents are by weight):

| PAN | 12.14% |
|---|---|
| NaOH | 0.52% |
| Sodium + potassium Thiocyanate | 17.78% |
| Water | 39.56% |

This composition corresponds to molar ratio [MY]/[CN]= 0.0588

The reaction mixture is pumped under protective nitrogen atmosphere into a grid of multiple glass tubes of diameter 120 mm and an overall length of approximately 100 meters. The tubular reactor is placed in water bath thermostated to 80° C. The reaction mixture is kept there for 18 hours. The mixture quickly darkens and solidifies, but turns of light brown color and liquefies toward the end of the reaction. The resulting viscous solution is pumped into a collection tank where it is cooled to 20–25° C. Approximately 2% of citric acid are added to neutralize free ammonia and remove its odor.

Resulting casting solution is used for production of hydrogel membranes. Solution is spread into a thin layer on a glass plate and coagulated by immersion into 5% solution of sodium thiocyanate. Coagulated hydrogel sheets are then washed several times in water until substantially all w-molecular residue is removed.

Resulting hydrogel membranes contain 91% by weight of liquid in equilibrium with pure water. If soaked in 0.9% by weight of NaCl, the liquid content decreases to about 80% by weight. Membranes can be sterilized by autoclaving in isotonic saline without a material change in properties.

EXAMPLE 3

100 weight parts of polyacrylonitrile homopolymer having weight average molecular weight of 270,000 Dalton is dissolved in solution of 380 weight parts of water, 150 weight parts of potassium thiocyanate and 350 weight parts of sodium thiocyanate. PAN is gradually added to the agitated solution until substantially dissolves to a viscous Solution A. Solution A is stirred for another two hours at approximately 80° C. to complete the dissolution, and then cooled down to ambient temperature below 20° C.

Solution B is prepared in another vessel. 17 weight parts of KOH are dissolved in a solution containing 150 weight parts of sodium thiocyanate and 200 weight parts of deionized water (DIW) at ambient temperature.

Solution A and B are mixed in a weight ratio 2.670 in a stirred glass-lined reactor at 20° C. The resulting master mix has the following composition (all percents are by weight):

| PAN | 7.42% |
|---|---|
| KOH | 1.26% |
| Sodium Thiocyanate | 57.12% |
| Potassium Thiocyanate | 11.14% |
| Water | 43.06% |

This composition corresponds to molar ratio [MY]/[CN]= 0.1600

The reaction mixture processed in the same apparatus as in Example 2 at 75° C. for 36 hours. The resulting viscous solution is pumped into a collection tank where it is cooled to 20–25° C. Approximately 2% of citric acid are added to neutralize free ammonia and remove its odor.

PAN with MW 250,000, reacted with higher conversion, by spinning of fibers into 5% coagulation bath, washing in 5% NaCl, acidified by 1% phosphoric acid, washed with DIW.

The solution is extruded through a multiple nozzle into a coagulation bath to form a bundle of fibers. The coagulation bath concentration has concentration of sodium thiocyanate approximately 10% by weight and concentration of potassium approximately 3.33% by weight maintained during the spinning. Coagulated fibers are washed in 10% by weight NaCl in water, and then they pass through a bath with 1% Sulfuric acid followed by bath of DIW. Wet hydrophilic acrylic fibers thus formed are stretched and dried under stress. Fibers are moderately hydrophilic in pure water, but strongly swelling in aqueous liquids at pH over about 7. Such fibers can be useful as absorptive fibers for wound dressings and other applications.

EXAMPLE 4

100 weight parts of polyacrylonitrile homopolymer having weight average molecular weight of 80,000 Dalton is dissolved in a solution of 380 parts of water and 500 weight parts of sodium thiocyanate. PAN is gradually added to the agitated solution until it substantially dissolves to the Solution A. Solution A is stirred for another 2 hours at approximately 60° C. to complete the dissolution, and then cooled down to ambient temperature below 20° C.

Solution B is prepared in another vessel. 20 weight parts of NaOH are dissolved in a solution containing 350 weight parts of sodium thiocyanate and 250 weight parts of deionized water (DIW) at ambient temperature. 1 weight part of hexamethylene diamine is added and dissolved in the mixture.

Solution A and B are mixed in weight ratio 1.573 in a stirred glass-lined reactor at 24° C. The resulting master mix has the following composition (all percents are by weight):

| | |
|---|---|
| PAN | 6.25% |
| NaOH | 1.25% |
| Sodium Thiocyanate | 53.09% |
| Hexamethylene diamine | 39.35% |
| Water | 0.06% |

This composition corresponds to a molar ratio [MY]/[CN]= 0.265

The master reaction mix is dispersed in 7000 weight parts of mineral oil with dispersed finely ground calcium carbonate as a dispersion stabilizer. The dispersion is heated to 75° C. in a slowly agitated reactor. The dispersed droplets of the reaction mix solidify and change color to a dark hue, then gradually change color to yellowish hue but stay in the rubbery solid state due to the permanent crosslinking. The dispersion is cooled down and swollen polymer beads are separated from the oil. The beads are dispersed into 10% by weight aqueous solution of sodium thiocyanate followed by washing with 5% NaCl and finally washed with 0.9% by weight NaCl solution and dried. Hydrogel beads thus formed can be used as a water absorbent or as a carrier of biologically active compounds.

Obviously, numerous modifications and variations of the present invention are possible in light of the above teachings. It is therefore understood that within the scope of the appended claims, the invention may be practiced otherwise than as specifically described herein.

What is claimed is:

1. A method of making acrylonitrile copolymers having multi block structure comprising acrylic acid, acryl amids and acrylamidine hydrophilic groups in hydrophilic blocks and residual nitrile groups in hydrophobic blocks, by partial hydrolysis of polyacrylonitrile to a predetermined hydrolysis conversion at which the hydrolysis is self terminating, by a process that improves quality and reduces product heterogeneity and which comprises:
   a.) forming a first reaction mixture which includes polyacrylonitrile dissolved in an aqueous reactive solvent containing sodium thiocyanate;
   b.) forming a second reaction mixture comprising a reaction catalyst of the general formula MY, wherein M is a metal selected from the group consisting of lithium, potassium and sodium and wherein Y is an anion derived from a week acid with pKa higher than about 5, dissolved in an aqueous reactive solvent containing sodium thiocyanate;
   c.) mixing the reaction mixtures of steps (a) and (b) above to form a master reaction mix;
   d.) dividing said reaction mix into a plurality of physical reaction compartments so as to increase outer surface area relative to volume as compared to outer surface area of a single reaction compartment to enhance cooling efficiency and to reduce undesirable center core thermal effects; and,
   e.) heating said divided master reaction mix to a predetermined reaction temperature range and maintaining said temperature range for a predetermined time sufficient for completion of a predetermined level of hydrolysis at which the resulting copolymer solution is substantially stable at ambient temperature.

2. The method of claim 1 wherein said predetermined reaction temperature range is sufficient to cause temporary solidification of said reaction mix.

3. The method of claim 2 wherein said predetermined reaction temperature range is higher than 50° C. and lower than 110° C.

4. The method of claim 1 wherein said mixing to form the master reaction mix is done at a temperature below 50° C.

5. The method of claim 1 wherein said hydrolytic reaction is carried out with exclusion of oxygen at least during the operations at which temperatures exceeds 50° C.

6. The method of claim 1 wherein said copolymer solution is further stabilized by addition of a weak organic acid that does not cause decomposition of said sodium thiocyanate.

7. The method of claim 6 wherein said weak organic acid is selected from the group consisting of citric acid, maleic acid, alanine, ascorbic acid, glutamic acid, benzoic acid and gluconic acid.

8. The method of claim 1 wherein said physical reaction compartments interface with a heat transfer medium thermostated to a temperature within the said reaction temperature range.

9. The method of claim 8 wherein said physical reaction compartments are interconnected tubular compartments.

10. The method of claim 8 wherein said physical reaction compartments are discrete enclosed containers.

11. The method of claim 8 wherein said physical reaction compartments have specific surface of the interface with said heat transfer medium larger than 20 $[m^{-1}]$.

12. The method of claim 1 wherein said predetermined reaction temperature range is sufficiently high to cause temporary solidification of said reaction mix.

13. The method of claim 1 wherein said alkali metal compound having formula MY is a compound wherein Y is selected from the group consisting of $OH^-$ $SiO_2^{2-}$ $CN^-$ and $CO_3^{2-}$.

14. The method of claim 1 wherein aid alkali metal compound having formula MY is NaOH.

15. The method of claim 1 wherein said alkali metal catalyst having formula MY has a predetermined molar ratio [MY]/[CN] in said master mix where [MY] represents molar concentration of MY and [CN] represents molar concentration of pendant CN groups of the polyacrylonitrile in 1,3 positions.

16. The method of claim 15 wherein said ratio [MY]/[CN] is within the range 0.02 to 0.25.

17. The method of claim 16 wherein said ratio [MY]/[CN] is within the range 0.05 to 0.15.

18. The method of claim 1 wherein said sodium thiocyanate has concentration in said master mix of about 50% to about 60% by weight, based on the weight of sodium thiocyanate and the weight of the water.

19. The method of claim 1 wherein a thiocyanate selected from the group consisting of potassium thiocyanate, lithium thiocyanate and calcium thiocyanate is also included in said master mix in a minority amount relative to said sodium thiocyanate.

20. The method of claim 1 wherein the resultant reaction product is formed into a shaped hydrogel article by a process comprising the following steps:
   a.) coagulating said copolymer solution with an excess of aqueous coagulating liquid; and,
   b.) extracting reaction residuals from hydrogel by an aqueous extraction liquid.

21. The method of claim 20 wherein said coagulating liquid is an aqueous solution containing less than about 5% by weight of inorganic salts selected from the group consisting of alkali metal halide, alkali metal thiocyanate, alkali metal sulphate, ammonium chloride and ammonium sulfate.

22. The method of claim 20 wherein said aqueous extraction liquid is a liquid selected from the group composed of water, aqueous solution of 0.9% by weight NaCL, isotonic buffered solution and Ringer solution.

23. The product which results from the method of claim 1.

24. A casing polymeric solution which results from the method of claim 1 and comprising said substantially stable copolymer solution.

25. A hydrogel which results from the method of claim 20.

* * * * *